(12) United States Patent
Gupta et al.

(10) Patent No.: US 12,389,285 B2
(45) Date of Patent: *Aug. 12, 2025

(54) OPTIMIZING KEY ALLOCATION DURING ROAMING USING MACHINE LEARNING

(71) Applicant: HEWLETT PACKARD ENTERPRISE DEVELOPMENT LP, Spring, TX (US)

(72) Inventors: Gopal Gupta, Bangalore (IN);
Abhinesh Mishra, Bangalore (IN);
Isaac Theogaraj, Bangalore (IN);
Sachin Ganu, San Jose, CA (US);
Bernd Bandemer, Santa Clara, CA (US); Jose Tellado, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,839

(22) Filed: Jan. 11, 2024

(65) Prior Publication Data
US 2024/0147314 A1  May 2, 2024

Related U.S. Application Data

(63) Continuation of application No. 17/391,559, filed on Aug. 2, 2021, now Pat. No. 11,910,249.

(51) Int. Cl.
*H04W 36/00* (2009.01)
*G06N 20/00* (2019.01)
(Continued)

(52) U.S. Cl.
CPC ........ *H04W 36/0038* (2013.01); *G06N 20/00* (2019.01); *H04L 41/16* (2013.01);
(Continued)

(58) Field of Classification Search
CPC .. H04L 41/16; H04L 63/101; H04W 36/0038; H04W 12/041; H04W 36/0061;
(Continued)

(56) References Cited

U.S. PATENT DOCUMENTS 10,390,273 B2 *  8/2019  Sankaranarayan ..........................
H04W 36/0094
10,511,931 B1 * 12/2019  Khawand ............. H04B 17/318
(Continued)

FOREIGN PATENT DOCUMENTS

WO    2020/159430 A1    8/2020
WO    2020/254859 A1   12/2020

OTHER PUBLICATIONS

"4G LTE Network Throughput Modelling and Prediction"; Elsherbiny et al.; GLOBECOM 2020-2020 IEEE Global Communications Conference | 978-1-7281-8298-8/20/$31.00 ©2020 IEEE; Dec. 7, 2020 (Year: 2020).

(Continued)

*Primary Examiner* — Benjamin H Elliott, IV
(74) *Attorney, Agent, or Firm* — Hewlett Packard Enterprise Patent Department

(57) ABSTRACT

Systems and methods are provided for optimizing resource consumption by bringing intelligence to the key allocation process for fast roaming. Specifically, embodiments of the disclosed technology use machine learning to predict which AP a wireless client device will migrate to next. In some embodiments, machine learning may also be used to select a subset of top neighbors from a neighborhood list. Thus, instead of allocating keys for each of the APs on the neighborhood list, key allocation may be limited to the predicted next AP, and the subset of top neighbors. In some embodiments, a reinforcement learning model may be used (Continued)

to dynamically adjust the size of the subset in order to optimize resources while satisfying variable client demand.

21 Claims, 9 Drawing Sheets

(51) Int. Cl.
*H04L 41/16* (2022.01)
*H04W 12/041* (2021.01)
*H04W 88/08* (2009.01)

(52) U.S. Cl.
CPC ..... *H04W 12/041* (2021.01); *H04W 36/0061* (2013.01); *H04W 88/08* (2013.01); *H04W 36/00835* (2018.08)

(58) Field of Classification Search
CPC . H04W 88/08; H04W 12/0431; H04W 12/08; H04W 36/38; H04W 36/0083; H04W 84/12; G06Q 20/00; G06N 3/0442; G06N 3/092; G06N 7/01
See application file for complete search history.

(56) References Cited

U.S. PATENT DOCUMENTS

| | | | | |
|---|---|---|---|---|
| 11,690,113 | B2* | 6/2023 | Eom | H04W 12/50 370/329 |
| 11,910,249 | B2* | 2/2024 | Gupta | H04W 12/0431 |
| 2007/0250713 | A1* | 10/2007 | Rahman | H04W 12/50 713/171 |
| 2007/0253369 | A1* | 11/2007 | Abhishek | H04W 36/0055 370/331 |
| 2008/0146230 | A1* | 6/2008 | Pandian | H04W 36/0016 455/445 |
| 2012/0008776 | A1* | 1/2012 | Ishida | H04W 12/041 380/247 |
| 2013/0232542 | A1* | 9/2013 | Cheng | H04L 63/08 726/4 |
| 2014/0113623 | A1* | 4/2014 | Garg | H04W 12/062 455/432.1 |
| 2014/0334336 | A1* | 11/2014 | Chen | H04W 28/18 370/254 |
| 2015/0120930 | A1* | 4/2015 | Kamthe | H04W 48/20 709/226 |
| 2017/0265108 | A1* | 9/2017 | Chen | H04W 36/0038 |
| 2018/0234900 | A1* | 8/2018 | Sankaranarayan | H04W 76/30 |
| 2019/0239158 | A1* | 8/2019 | Wulff | H04W 48/20 |
| 2019/0319868 | A1* | 10/2019 | Svennebring | H04W 24/08 |
| 2019/0364380 | A1* | 11/2019 | Khawand | H04W 4/02 |
| 2020/0059356 | A1* | 2/2020 | Shveykin | H04L 9/083 |
| 2020/0076520 | A1* | 3/2020 | Jana | H04B 17/327 |
| 2020/0092718 | A1* | 3/2020 | Ohlsson | H04W 8/02 |
| 2020/0320397 | A1* | 10/2020 | Liu | H04L 67/34 |
| 2021/0406696 | A1* | 12/2021 | Liu | H04L 41/0894 |
| 2022/0038359 | A1* | 2/2022 | Svennebring | H04W 24/08 |
| 2022/0292827 | A1* | 9/2022 | Chen | G06F 16/7854 |
| 2023/0029760 | A1* | 2/2023 | Gupta | H04L 63/101 |
| 2023/0033287 | A1* | 2/2023 | Agarwal | H04W 36/0038 |
| 2023/0300687 | A1* | 9/2023 | Mattaparti | H04W 36/0038 |
| 2024/0147314 | A1* | 5/2024 | Gupta | H04W 12/041 |

OTHER PUBLICATIONS

"A Novel Online Machine Learning Based RSU Prediction Scheme for Intelligent Vehicular Networks"; Aljeri et al.; 2019 IEEE/ACS 16th International Conference on Computer Systems and Applications (AICCSA); Nov. 3, 2019 (Year: 2019).

"Artificial Intelligence-Enabled Cellular Networks: A Critical Path to Beyond-5G and 6G"; Shafin et al.; IEEE Wireless Communications (vol. 27, Issue: 2, Apr. 2020) (Year: 2020).

"Edge Intelligence: Paving the Last Mile of Artificial Intelligence With Edge Computing"; Zhou et al.; Proceedings of the IEEE | vol. 107, No. 8, Aug. 2019 (Year: 2019).

"Forecasting Quality of Service for Next-Generation Data-Driven WiFi6 Campus Networks"; Ak et al.; IEEE Transactions on Network and Service Management, vol. 18, No. 4, Dec. 2021 (Year: 2021).

"Predictive UAV Base Station Deployment and Service Offloading With Distributed Edge Learning"; Zhao et al.; IEEE Transactions on Network and Service Management, vol. 18, No. 4, Dec. 2021 (Year: 2021).

Arista Networks, Inc., "Roaming in WI-FI Network," 2022, https://wifihelp.arista.com/post/roaming-in-wifi-networks.

Memon S. et al., Using Machine Learning for Handover Optimization in Vehicular Fog Computing, (Research Paper), SAC '19: Proceedings of the 34th ACM/SIGAPP Symposium on Applied Computing, Dec. 18, 2018, 9pgs, ACM, Limassol, Cyprus.

slideshare.com, "Optimizing Aruba WLANs for Roaming Devices," Apr. 14, 2014, https://www.slideshare.net/ArubaNetworks/optimizing-aruba-wlans-for-roaming-devices.

* cited by examiner

OPTIMIZING KEY ALLOCATION DURING ROAMING USING MACHINE LEARNING

CROSS REFERENCE TO RELATED APPLICATIONS

This application is a continuation of, and claims the priority benefit of, U.S. patent application Ser. No. 17/391,559, filed on Aug. 2, 2021, the contents of which are incorporated herein by reference in their entirety.

DESCRIPTION OF RELATED ART

Roaming occurs when a wireless client device moves outside the usable range of one access point (AP) and connects to another. This process of disconnecting from one AP and connecting to another AP is known as basic service set (BSS) transition.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7 illustrates graphical data from a proof-of-concept experiment which used a Markov Chain Model to predict the next AP a client device would migrate to.

FIG. 8 illustrates graphical data from a proof-of-concept experiment which used a deep machine learning based model to predict the next AP a client device would migrate to.

Figure 1:
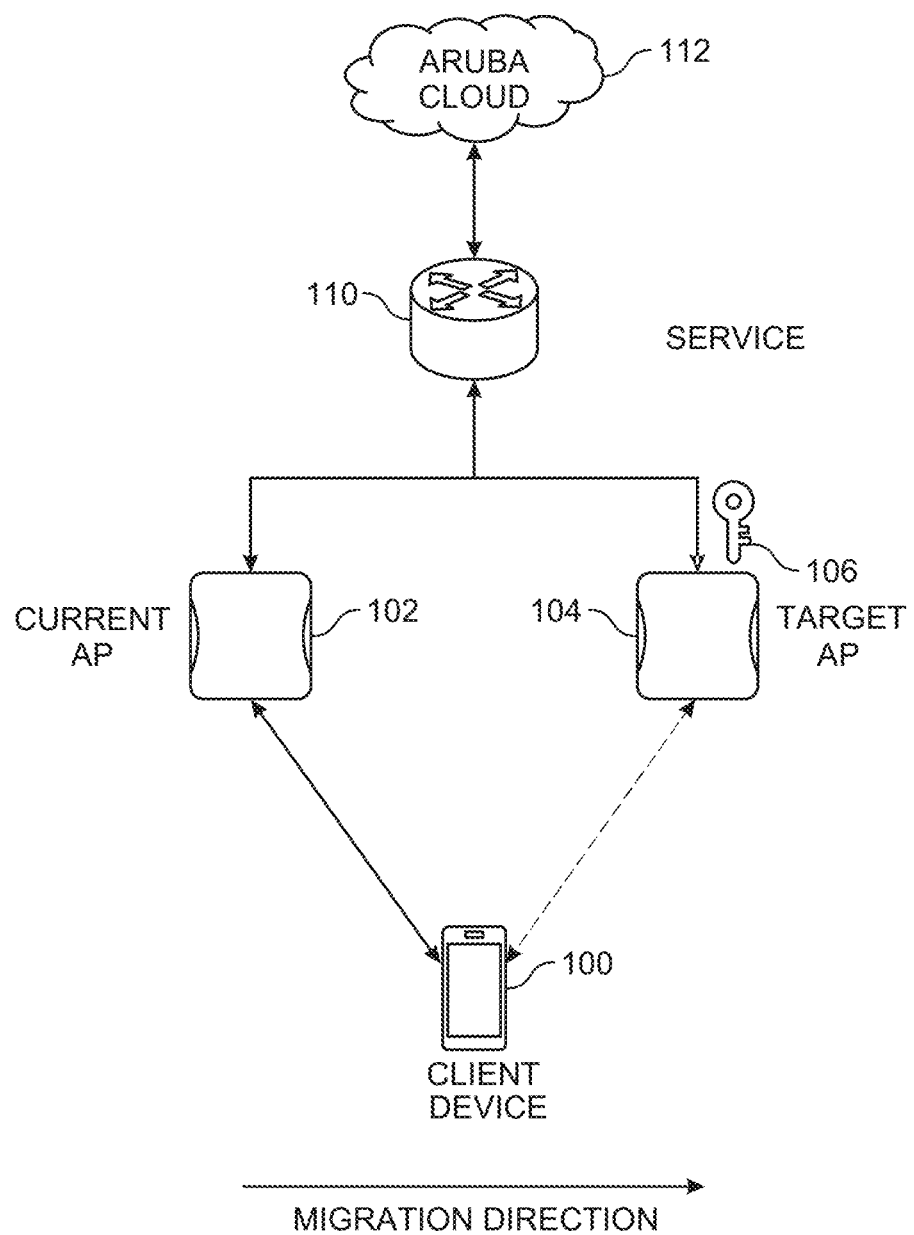
FIG. 1 is a diagram illustrating an example fast roaming scenario.

The figures are not exhaustive and do not limit the present disclosure to the precise form disclosed.

DETAILED DESCRIPTION

Standards like 802.11r enable fast BSS transition/fast roaming (i.e. they reduce the length of time that connectivity is interrupted between a wireless client device and a wireless network while roaming). Specifically, 802.11r (also known as Fast BSS transition or fast roaming) describes mechanisms by which a wireless client device can reestablish existing security and/or QoS parameters prior to reconnecting to a new AP. Put another way, fast roaming minimizes delay in BSS transition by essentially "pre-authenticating" a wireless client device at the new/target AP prior to BSS transition. Fast roaming is achieved by caching cryptographic keys associated with a wireless client device (i.e. client keys) on selected APs prior to BSS transition. Specifically, a key management service (e.g. a key management service in the Aruba Cloud) generates client keys, and propagates them to a selected group of APs. Accordingly, each selected AP caches the client key, effectively pre-authenticating the wireless client device at the AP.

The current key allocation process for 802.11r is based on a static path loss value. More specifically, keys are allocated to all the APs on a neighborhood list comprised of APs with a path loss value below a certain threshold. Typically, the threshold path loss value is liberally selected in order to ensure that the 802.11r standard is met (i.e. to ensure that the AP a wireless client device connects to next will have a cached client key). However, by the same token, the current "brute-force" method allocates more keys than it needs to. This allocation of excess keys has a resource, and monetary cost, especially in dense deployments (i.e. deployments with a high concentration of APs on a neighborhood list and/or client device traffic).

For illustration, if "C" represents the number of client devices connected to an AP, and "X" represents the number of APs on the neighborhood list for that AP, the current system will allocate "C*X" keys for the client devices connected to the AP. Put another way, a key management service (e.g. a key management service in the Aruba Cloud) must generate and propagate "C*X" client keys. By extension, each of the "X" APs on the neighborhood list must cache "C" clients keys. In this way, valuable cloud infrastructure and AP resources are wasted unless "C*X" is optimized/minimized. Moreover, because each computation made by a cloud based key management service has a cost (as does each message between the cloud based key management service and an AP), this excess key allocation has a cost as well.

Accordingly, embodiments of the technology disclosed herein optimize resource consumption by bringing intelligence to the key allocation process. Specifically, embodiments of the disclosed technology use machine learning to predict which AP a wireless client device will migrate to next. In some embodiments, machine learning may also be used to select a subset of top neighbors from the neighborhood list. Thus, instead of allocating keys for each of the APs on the neighborhood list, key allocation may be limited to the predicted next AP, and the subset of top neighbors. Moreover, in some embodiments, machine learning may be used to dynamically adjust the size of the subset in order to optimize resources while satisfying variable client demand.

FIG. 1 is a diagram illustrating an example fast roaming scenario where key allocation is handled by key management service 110 running on Aruba Cloud 112.

In the illustrated diagram, client device 100 is currently connected to Current AP 102, but is migrating towards Target AP 104. As will be described in greater detail below, key management service 110 may identify Target AP 104 as a likely migration candidate (e.g. it may predict that Target AP 104 is the most likely migration candidate based on its current association to Current AP 102, and learned client device migration behavior). Accordingly, before client device 100 attempts to connect to Target AP 104, key management service 110 may allocate a cryptographic key associated with client device 100 (e.g. client key 106) to Target AP 104, which will cache it. Caching client key 106 at Target AP 204 essentially performs one step of a two-step connection process prior to BSS transition. More specifically, before client device 100 can connect with Target AP 104, client device 100 must associate with Target AP 104, and be authenticated by Target AP 104. While streamlined under the 802.11r standard, the association and authentication steps are time consuming processes which require communication between client device and AP. However, by caching client key 106 at Target AP 104 before client device 100 attempts to connect to it, the authentication step is essentially "pre-performed." Put another way, the authentication step may be skipped/shortened during BSS transition because it has already been performed. In this way, the key allocation process of 802.11r reduces the length of time that connectivity is interrupted between a client device and a wireless network while roaming.

Figure 2:
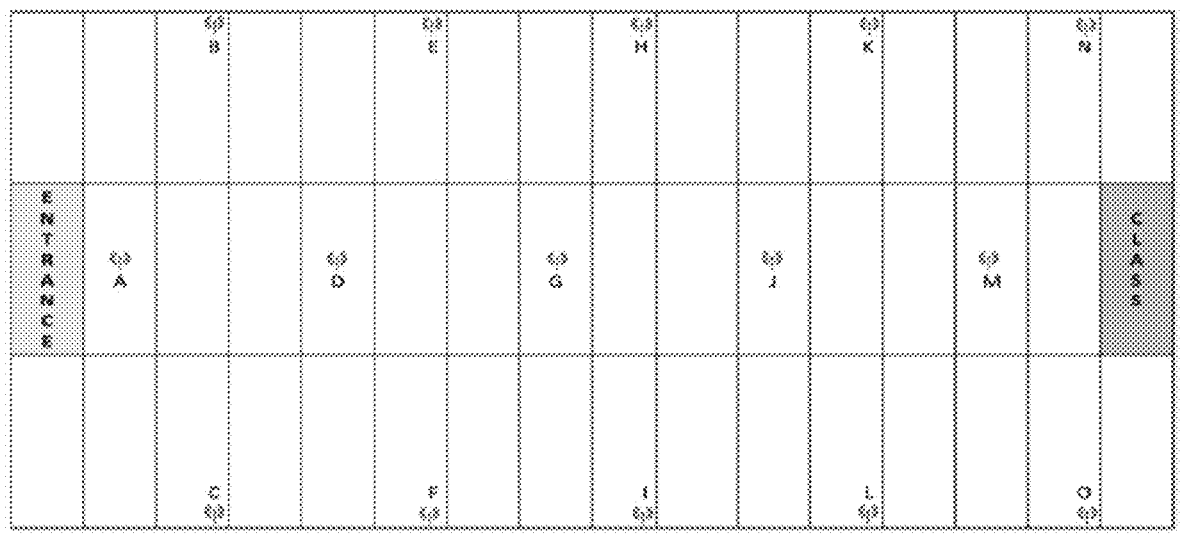
FIG. 2 illustrates an example experiment conducted in a campus deployment scenario where connection/association data from a chosen client device was sampled over a week period.
Figure 2:
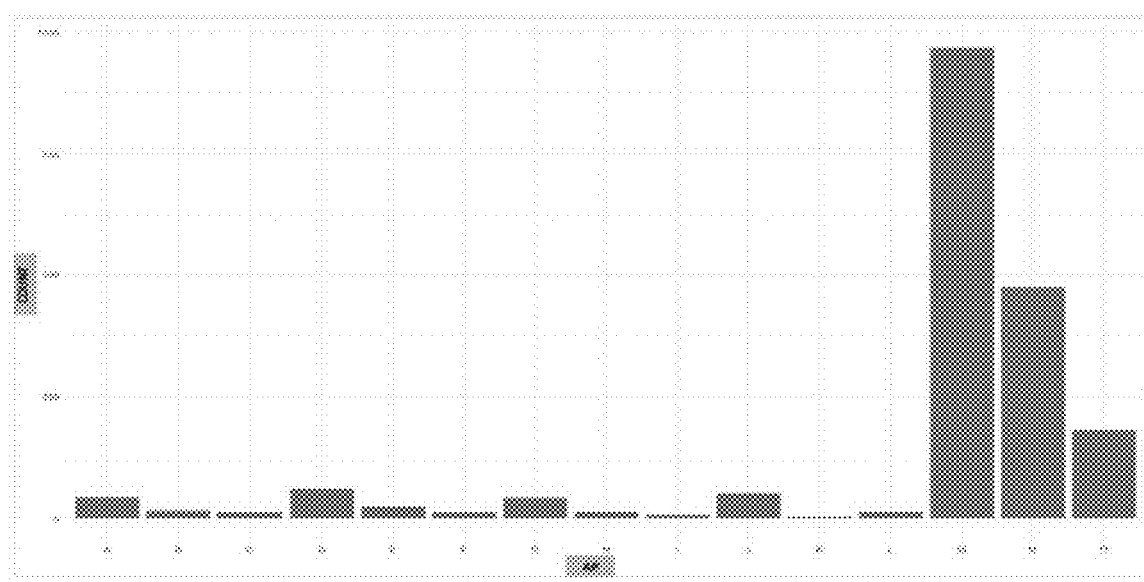

FIG. 2 illustrates an example experiment conducted in a campus deployment scenario where connection/association data from a chosen client device was sampled for an entire week during a set lecture time. Connection/association data was recorded for the client device every minute, yielding 10,446 entries.

Diagram 200 is a pictorial representation of AP deployment on the campus. As can be seen in the diagram, APs "M", "N", and "O" are closest to the classroom where the client attended lecture.

Graph 202 is a graphical representation of the recorded client device connection/association data. As can be seen in the graph, during lecture time, the client device was primarily connected to APs "M", "N", and "O" (i.e. the APs closest to the classroom). As will be described in greater detail below, client device connection/association data like this may be used to train machine learning models, such as a Markov Chain Model. In turn, based on the AP the client device is currently connected to and learned client device migration behavior, these machine learning models may be used to (1) predict the AP the client device will migrate to next; and (2) select a subset top neighbor APs which comprise the next most likely migration candidates.

Figure 3:
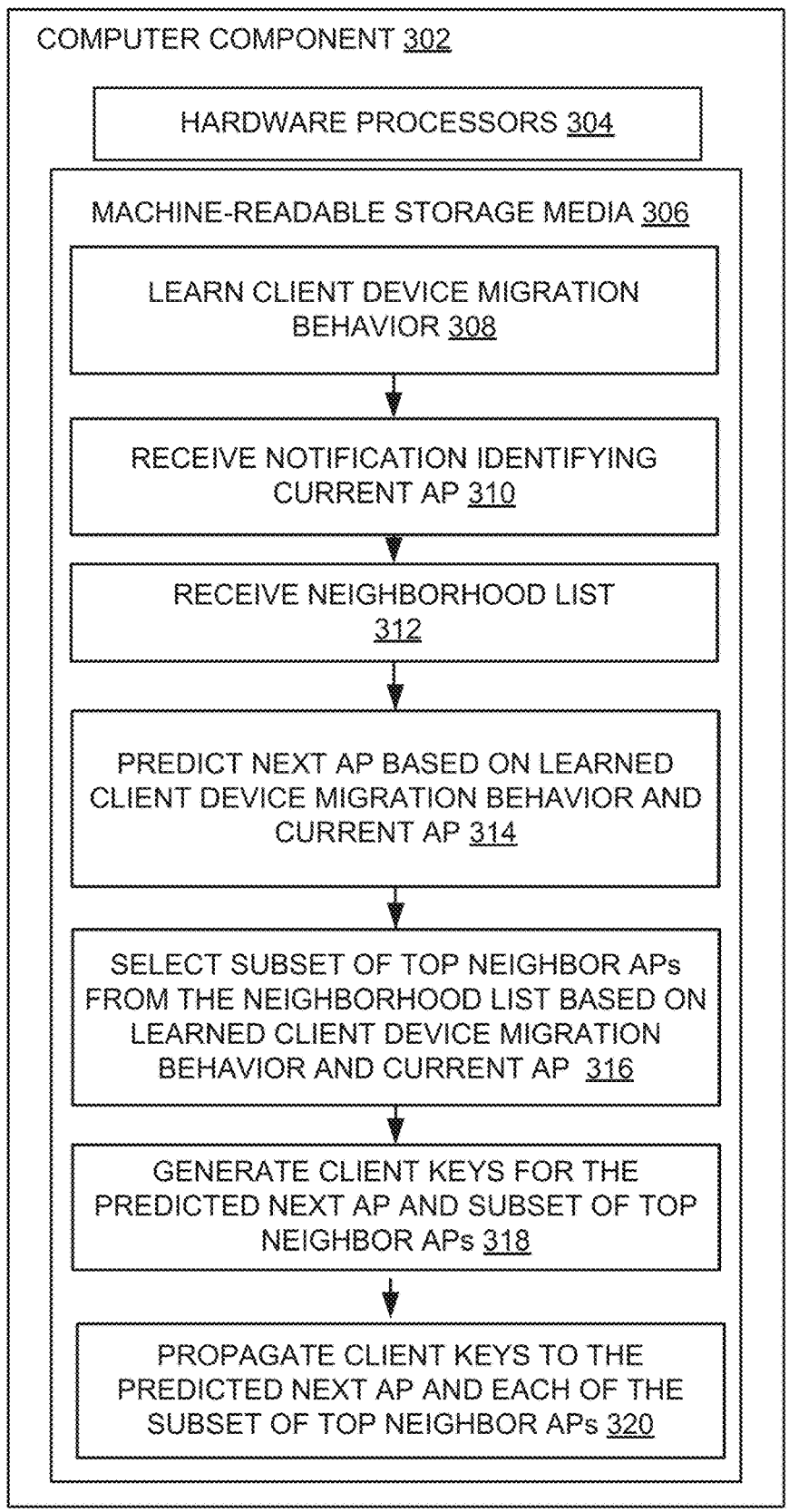
FIG. 3 illustrates an example iterative process performed by a computing system for optimizing key allocation during fast roaming using machine learning.

FIG. 3 illustrates an example iterative process performed by a computing system 300 for optimizing key allocation during fast roaming using machine learning. Computing system 300 may be comprised of one or more computing components, such as computing component 302. Computing component 302 may be, for example, a server computer, a controller, or any other similar computing component capable of processing data. For example, in some embodiments computing component 302 may be a cloud-based key management service. In the example implementation of FIG. 3, the computing component 302 includes a hardware processor 304, and machine-readable storage medium 306.

Hardware processor 304 may be one or more central processing units (CPUs), semiconductor-based microprocessors, and/or other hardware devices suitable for retrieval and execution of instructions stored in machine-readable storage medium 306. Hardware processor 304 may fetch, decode, and execute instructions, such as instructions 308-320, to control processes or operations for optimizing the system during run-time. As an alternative or in addition to retrieving and executing instructions, hardware processor 304 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 306, may be any electronic, magnetic, optical, or other physical storage device that contains or stores executable instructions. Thus, machine-readable storage medium 306 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 306 may be a non-transitory storage medium, where the term "non-transitory" does not encompass transitory propagating signals. As described in detail below, machine-readable storage medium 306 may be encoded with executable instructions, for example, instructions 308-320.

Hardware processor 304 may execute instruction 308 to learn migration behavior associated with a client device. In some embodiments, migration behavior may be learned by tracking the movement of the client device (between APs) over time. For example, in a similar manner to that described in conjunction with FIG. 2, hardware processor 304 may record which AP a particular client device is connected to once every minute for a week. Based on this data, the hardware processor 304 may learn to which APs the client device tends to connect throughout various times of the day and/or week. For example, in a college campus scenario, the hardware processor 304 may learn that every day between 2 p.m. and 3 p.m. a particular client device was connected to either one of two APs deployed near a particular lecture hall. In addition, hardware processor 304 may learn that after 3 p.m., the client device tended to connect to successive APs deployed between the lecture hall and a bus stop. In this way, hardware processor 304 may not only learn which APs a client device connects to the most often, but may also discern patterns in client device migration behavior.

Hardware processor 304 may execute instruction 310 to receive a notification which identifies the AP the client device is currently connected to (i.e. the current AP). As will be described in more detail below, this information may be used to (1) build a list of APs in the neighborhood of the current AP (i.e. the neighborhood list); and (2) predict which AP the client device will migrate to next (i.e. the predicted next AP).

Hardware processor 304 may execute instruction 312 to receive a list of APs in the neighborhood of the current AP (i.e. the neighborhood list). In some embodiments, APs may be selected for the neighborhood list based on path loss value relative to the current AP. For example, all APs which have a path loss value below a certain threshold may be selected for the neighborhood list. Put another way, an AP may be considered to be "in the neighborhood of" the current AP when the path loss value between the AP and the current AP is below a threshold value. More generally, algorithms which take path loss as an input may be used to compute a neighborhood list for the AP the client device is currently connected to.

Hardware processor 304 may execute instruction 314 to predict which AP the client device will migrate to next (i.e. the predicted next AP) based on the current AP and the learned client device migration behavior. Hardware processor 304 may use any number of machine learning techniques/models to make this prediction. For example, in some embodiments hardware processor 304 may use a Markov Chain Model. More specifically, a Markov chain may be built where each connection point of the Markov chain represents an AP on the neighborhood list. Based on the current AP and the learned migration behavior, each AP may be assigned a probability of being the AP the client device migrates to next. Accordingly, the AP on the Markov chain with the highest probability of being the next AP will be the predicted next AP. In other embodiments, other machine learning models may be used to predict the AP the client device will migrate to next. For example, deep machine learning based models, such as a Long Short-Term Memory (LSTM) model, may be used. For illustration/proof of concept, data from an experiment which used a deep machine learning based LSTM model to predict the next AP a client device would migrate to is provided in FIG. 8.

Hardware processor 304 may execute instruction 316 to select a subset of top neighbor APs from the neighborhood list (not including the predicted next AP) based on the current AP and the learned client device migration behavior. The size of the subset may be greater than or equal to zero, and less than or equal to the number of APs on the neighborhood list (minus one if the predicted next AP is on the neighborhood list). In some embodiments, a Markov Chain Model may be used to make this selection. As described above, a Markov chain may be built where each connection point of the Markov chain represents an AP on the neighborhood list. Accordingly, based on the current AP and the learned migration behavior, each AP may be assigned a probability of being the AP the client device migrates to next. In some embodiments, a threshold probability may be chosen and all the APs on the Markov chain with a probability above the threshold may be selected. In other embodiments, an optimal size for the subset may be derived, and the APs with the highest associated probabilities on the Markov chain (other than the predicted next AP) may be selected. As will be described in more detail in conjunction with FIG. 6, the optimal size for the subset may be derived using machine learning. For example, a reinforcement learning model may be used to derive an optimal size for the subset which minimizes resource consumption while satisfying client demand to meet the fast roaming standard. Moreover, the size of the subset may be dynamically adjusted as deployment dynamics change over time (i.e. client demand/client device traffic changes, deployment architecture changes, etc.).

Hardware processor 304 may execute instruction 318 to generate a cryptographic key associated with the client device (i.e. a client key) for the predicted next AP, and the subset of top neighbors selected in instruction 316. It should be understood that when the size of the subset (plus the predicted next AP) is less than the number of APs on the neighborhood list, this operation consumes less resources than the conventional key generation process for 802.11r, which generates a key for each AP on the neighborhood list. Moreover, assuming the predicted next AP is on the neighborhood list, key allocation by the disclosed method will never consume more resources than the conventional, "brute force" method.

Hardware processor 304 may execute instruction 320 to propagate a client key to the predicted next AP, and each of the top neighbor APs selected in instruction 316. Accordingly, the client keys may be cached by the APs. In this way, if the AP the client device migrates to next is any one of the predicted next AP, or one of the subset of top neighbor APs, the fast roaming standard is met for that BSS transition.

Figure 4:
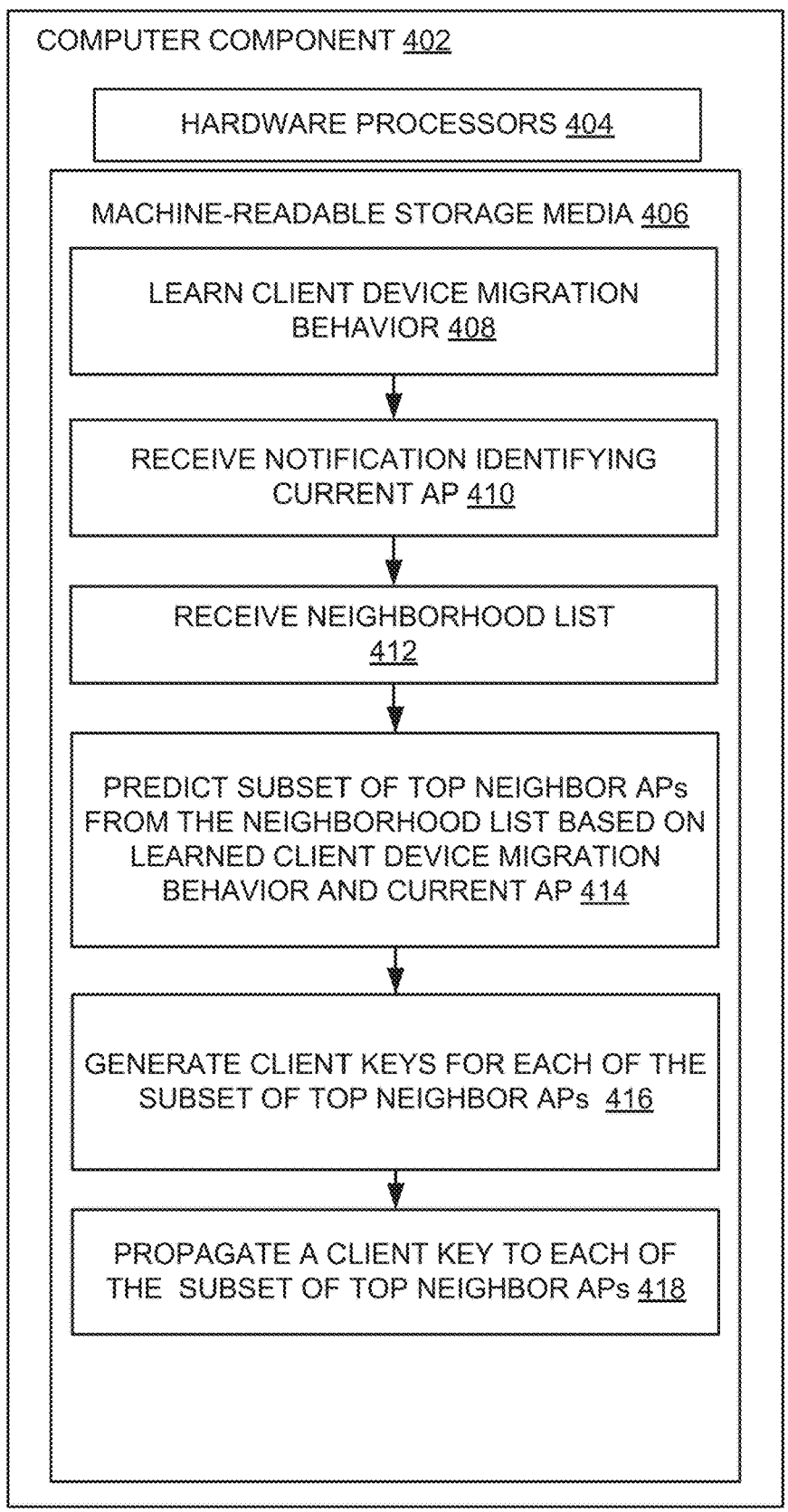
FIG. 4 illustrates another example iterative process performed by a computing system for optimizing key allocation during fast roaming using machine learning.

FIG. 4 illustrates another example iterative process for optimizing key allocation during fast roaming using machine learning, performed by a computing system 400. Computing system 400 may be comprised of one or more computing components, such as computing component 402. Like computing component 302, computing component 402 may be, for example, a server computer, a controller, or any other similar computing component capable of processing data. For example, in some embodiments computing component 402 may be a cloud-based key management service. In the example implementation of FIG. 4, the computing component 402 includes a hardware processor 404, and machine-readable storage medium 406. Here, hardware processor 404 and machine-readable storage medium 406 may be the same as/similar to hardware processor 304 and machine-readable storage medium 306 respectively. Accordingly, hardware processor 404 may fetch, decode, and execute instructions, such as instructions 408-418, to control processes or operations for optimizing key allocation during fast roaming using machine learning Hardware processor 404 may execute instruction 408 to learn migration behavior in the same/similar manner as described in conjunction with FIG. 3.

Hardware processor 404 may execute instruction 410 to receive a notification which identifies the AP the client is currently connected to (i.e. the current AP) in the same/similar manner as described in conjunction with FIG. 3.

Hardware processor 404 may execute instruction 412 to receive a list of APs in the neighborhood of the current AP (i.e. the neighborhood list) in the same/similar manner as described in conjunction with FIG. 3.

Hardware processor 404 may execute instruction 414 to predict a subset of top APs from the neighborhood list based on the current AP and the learned client device migration behavior. Here, the size of the subset will be greater than zero, and less than or equal to the number of APs on the neighborhood list. As described in conjunction with FIG. 3, hardware processor 404 may use any number of machine learning techniques/models to make this prediction. For example, in some embodiments hardware processor 404 may use a Markov Chain Model where each connection point of the Markov chain represents an AP on the neighborhood list. Accordingly, based on the current AP and the learned migration behavior, each AP may be assigned a probability of being the AP the client device migrates to next. In some embodiments, a threshold probability may be chosen and all the APs on the Markov chain with a probability above the threshold may be predicted. In other embodiments, an optimal size for the subset may be derived, and the APs with the highest associated probabilities on the Markov chain may be predicted. As will be described in more detail in conjunction with FIG. 6, an optimal size for the subset may be derived using machine learning. For example, a reinforcement learning model may be used to derive an optimal size for the subset which minimizes resource consumption while satisfying client demand to meet the fast roaming standard. Moreover, the size of the subset may be dynamically adjusted as deployment dynamics change over time (i.e. client demand/client device traffic changes, deployment architecture changes, etc.).

Hardware processor 404 may execute instruction 416 to generate a key associated with the client device (i.e. a client key) for each of the top neighbors predicted in instruction 414.

Hardware processor 404 may execute instruction 418 to propagate a client key to each of the top neighbor APs predicted in instruction 414. Accordingly, the client keys may be cached by the APs.

Figure 5:
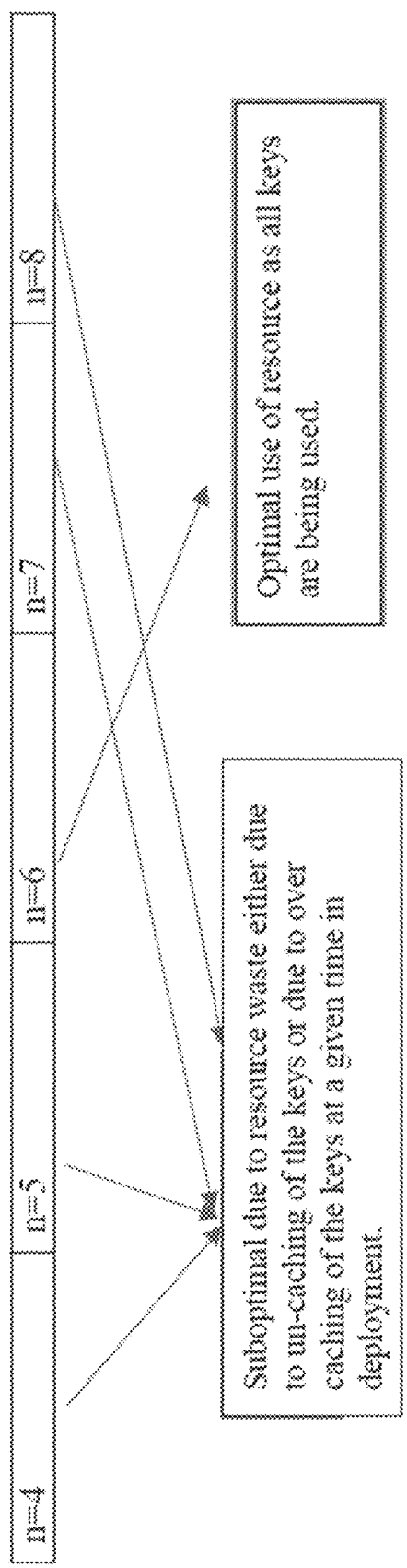
FIG. 5 is an example diagram which illustrates how adjusting the number of APs to which client keys are allocated may effect resource consumption and client experience.

FIG. 5 is an example diagram which illustrates how adjusting the size of the subset of top neighbors selected from the neighborhood list may effect resource consumption and client experience. It should be understood that in the contexts of the processes described in conjunction with FIGS. 3 and 4, the subset of top neighbors is slightly different. In the process described in conjunction with FIG. 3, the subset of top neighbors does not include the predicted next AP. Put another way, client keys are allocated to the predicted next AP and each of the APs in the subset. By contrast, in the process described in conjunction with FIG. 4, the subset of top neighbor APs includes the predicted next AP. Accordingly, client keys are only allocated to the APs in the subset. While the subset of top neighbors is slightly different in each process, it should be understood that what it means to optimize the size of the subset may be the same. Specifically, by either definition, the optimal size of the subset is the size which satisfies client demand, while consuming the least number of resources.

In the illustrated example, the optimal size of the subset of top neighbor APs is 6 (i.e. n=6, where "n" represents the number of APs in the subset). As alluded to above, depending on the key allocation optimization process, this may indicate that allocating keys at 7 APs (i.e. "n+1") or 6 APs (i.e. "n") is optimal for the given deployment. Here, n=4 and n=5 are suboptimal subset sizes because they do not adequately satisfy client demand (i.e. there are too many instances where a client device migrates to an AP with an un-cached key). In contrast, n=7 and n=8 are suboptimal subset sizes because they consume more resources than needed to satisfy client demand. Put another way, at n=7 and n=8, the key management service allocates more keys than it needs to, thereby wasting cloud infrastructure and AP resources.

As alluded to above, an optimal size of the subset of top neighbor APs may be derived using machine learning. For example, a reinforcement learning based algorithm may be constructed which dynamically adjusts the size of the subset as deployment dynamics change (e.g. client device traffic changes, architecture of the deployment changes, etc.).

In some embodiments, the reinforcement learning based algorithm may balance exploitation (i.e. making the best decision based on known information) and exploration (i.e. gathering more information for potential long-term reward). In the context of adjusting the subset to an optimal size, exploitation may equate to maintaining the size of the subset at a size known to satisfy client demand. In contrast, exploitation may equate to exploring/testing other subset sizes to learn how effectively they satisfy client demand. A number of methods/models may be used to solve the exploitation-exploration dilemma, such as, Thompson Sampling, Trust Region Policy Optimization, or any other reinforcement learning model/algorithm, such as the reinforcement learning based algorithm described in conjunction with FIG. 6.

Figure 6:
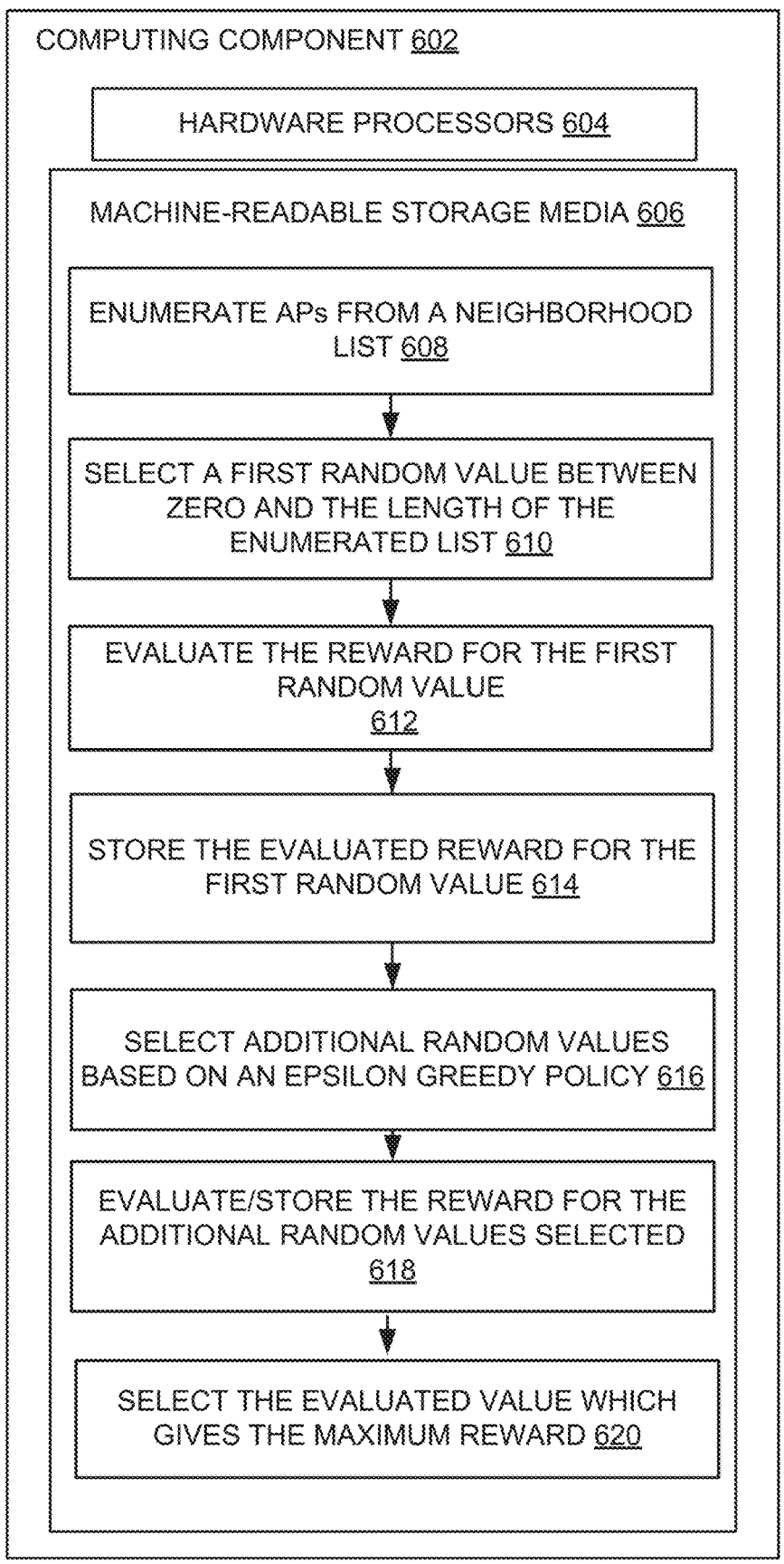
FIG. 6 illustrates an example iterative process performed by a computing system for dynamically adjusting the number of APs to which client keys are allocated, in order to conserve resources while satisfying client demand.

FIG. 6 illustrates an example iterative process performed by a computing system 600 for dynamically adjusting the size of the subset of top neighbor APs in order to conserve resources while satisfying client demand. Computing system 600 may be comprised of one or more computing components, such as computing component 602. As with computing component 302, computing component 602 may be, for example, a server computer, a controller, or any other similar computing component capable of processing data. For example, in some embodiments computing component 602 may be a cloud-based key management service. In the example implementation of FIG. 6, the computing component 602 includes a hardware processor 604, and machine-readable storage medium 606. Here, hardware processor 604 and machine-readable storage medium 606 may be the same as/similar to hardware processor 304 and machine-readable storage medium 306 respectively. Accordingly, hardware processor 604 may fetch, decode, and execute instructions, such as instructions 608-618, to control processes or operations for optimizing key allocation during fast roaming using machine learning.

Hardware processor 604 may execute instruction 608 to enumerate all the APs on a neighborhood list in decreasing order of their latest path loss measurement. This list may be referred to as vector Neigh_APs.

Hardware processor 604 may execute instruction 610 to select a random value, "$N_1$", which is greater than or equal to zero, and less than or equal to the length of vector Neigh_APs.

Hardware processor 604 may execute instruction 612 to evaluate the reward for "$N_1$". In some embodiments, "$N_1$" may be evaluated using the following reward matrix:

(i) For each successful roaming attempt, increase the reward by $$\left(1 - \frac{AP_{unused}}{t}\right);$$

where "$AP_{unused}$" is the number of APs at which client keys are cached, which are not connected to during the successful roaming attempt, and "t" is a hyperparameter that is greater than the number of APs on the neighborhood list.

(ii) For each failed roaming attempt, decrease the reward by 2.

In some embodiments, a successful roaming attempt may be defined as a roaming attempt where a client device migrates to an AP at which a client key has been cached. By contrast, a failed roaming attempt may be defined as a roaming attempt where the client device migrates to an AP which does not have a cached client key. In other embodiments, a failed roaming attempt may be defined as a roaming attempt where the client device migrates to an AP which (1) does not have a cached client key; and (2) the client device has connected to before. It should be understood that the reward matrix above is provided only as an illustrative example. Other reward matrices may be used to evaluate the reward for "$N_1$". For example, another reward matrix may be based on roaming iterations comprised of multiple roaming attempts by multiple client devices. Accordingly, a successful roaming iteration may be defined as a roaming iteration where all roaming attempts within the iteration where successful. By contrast, a failed roaming iteration may be defined as a roaming iteration where at least one of the roaming attempts within the iteration failed.

Hardware processor 604 may execute instruction 614 to store the evaluated reward for "$N_1$" in a table, e.g. <N, reward>.

Hardware processor 604 may execute instruction 616 to select a new random value between zero and the length of vector Neigh_APs, e.g. "$N_2$". In some embodiments, the new random value may be selected using the epsilon greedy policy below, where epsilon refers to the probability of choosing to explore.

```
def epsilon_greedy(epsilon):
    random_value = np.random.random( )
    choose_random = random_value < epsilon
    if choose_random:
        action = np.random.choice(Neigh_APs)
    else:
        action = np.argmax(Q)
    return action
```

In this way, additional values beyond "$N_1$" and "$N_2$" may be selected.

Hardware processor 604 may execute instruction 618 to evaluate and store the rewards for the additional values selected according to the epsilon greedy policy in the same/similar manner as described in conjunction with instructions 612 and 614.

Hardware processor 604 may execute instruction 620 to choose the evaluated value which gives the maximum reward. In some embodiments, if the reward for the chosen value deteriorates over time, the reinforcement learning model may explore a different subset size based on the epsilon greedy policy detailed in instruction 616. As illustrated by the example reward matrix above, a reward may deteriorate when at least one of the following occurs: (1) the number of failed roaming attempts/iterations increases relative to the number of successful roaming attempts/iterations; or (2) the number of APs at which client keys are cached, which are not connected to during a successful roaming attempt/iteration, increases.

Figure 7:
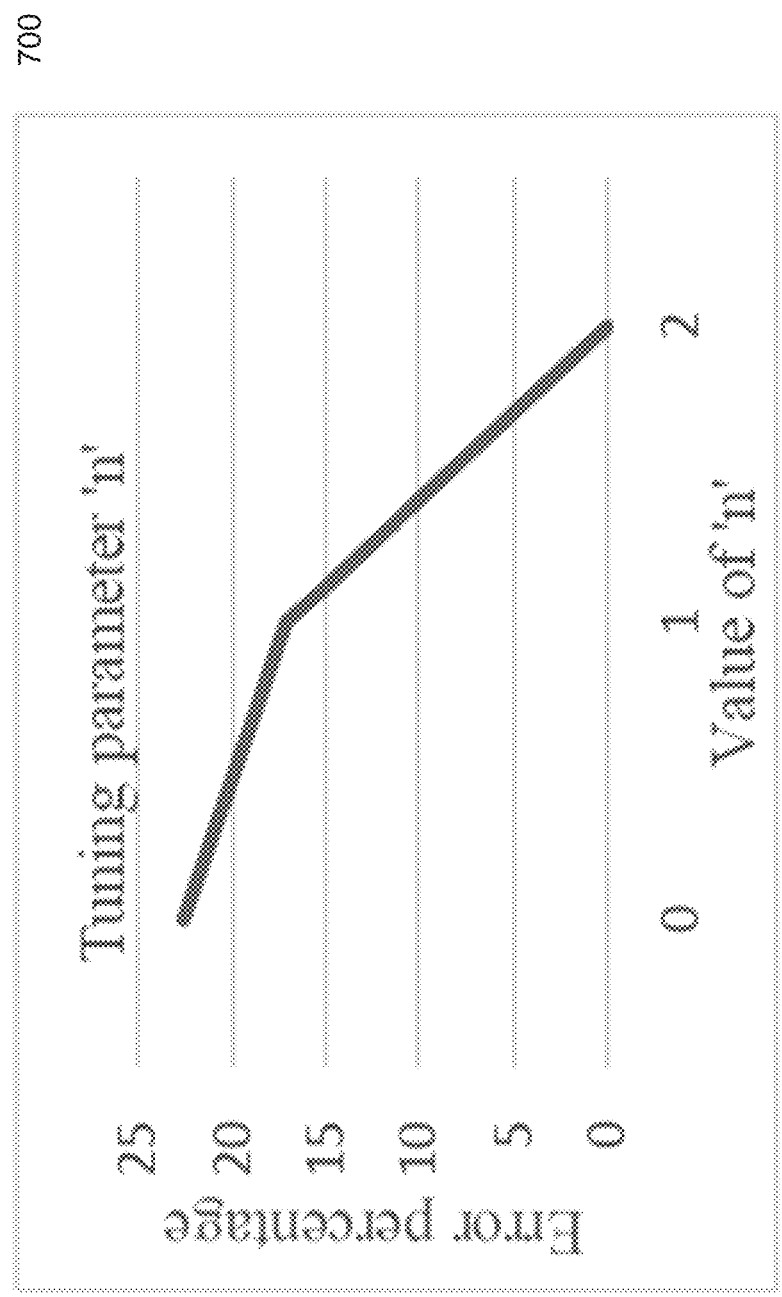

FIG. 7 illustrates graphical data from a proof-of-concept experiment which used a Markov Chain Model to predict the AP a client device would migrate to next. In the experiment, the Markov Chain Model was also used to select the top neighbor APs. Here, then size of the subset of top neighbor APs was adjusted artificially in order to demonstrate the relationship between the size of the subset and error percentage. In other embodiments, the size of the subset may be adjusted using machine learning. For example, the size of the subset may adjusted using the reinforcement learning based algorithm described in conjunction with FIG. 6.

Graph 700 illustrates results from the experiment. More specifically, Graph 700 plots error percentage as a function of the value "n" (i.e. the size of the subset). Here, an error is defined as a failed fast roaming attempt (as defined above). Thus, an error percentage of 20% would mean fast roaming attempts failed 20% of the time.

As can be seen in the graph, as the size of the subset increases, the error percentage decreases (i.e. Fast BSS transition is achieved at a higher percentage). More specifically, when "n" was set to 0, the error percentage was 22.6%. This means that the Markov Chain Model predicted the next AP with 77.4% accuracy. When "n" was set to 1 (i.e. where only one "top" neighbor was selected for the subset) the error percentage dropped to 17.14%. Interestingly, when the value of "n" was increased by just one AP, the error percentage dropped to 0%. This may indicate that the optimal size for the subset was 2 in the simple proof-of-concept deployment. However, as alluded to above, in other (more complex) deployments, machine learning may be used to derive and/or dynamically adjust the optimal size of the subset.

Figure 8:
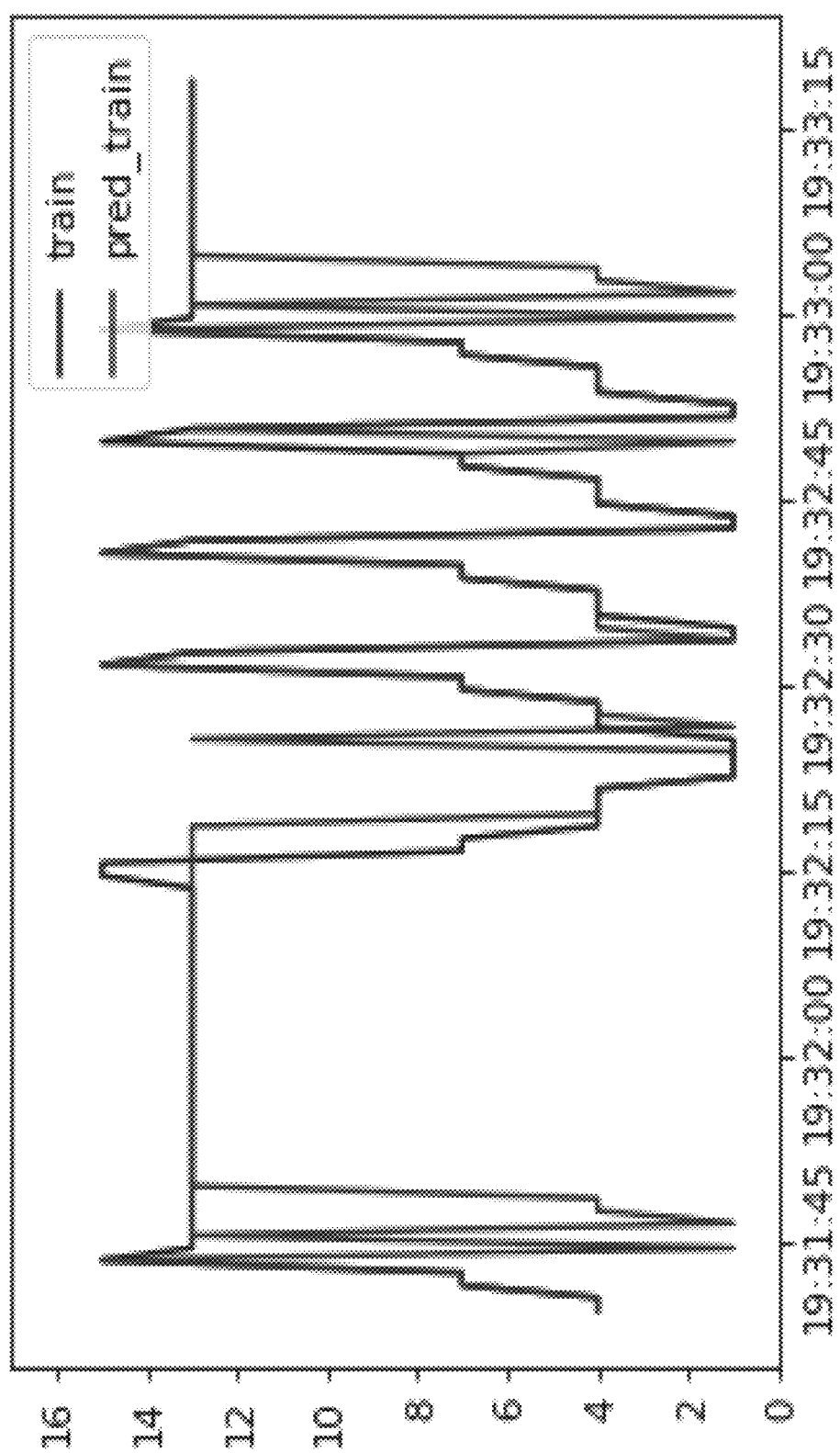

FIG. 8 illustrates graphical data from an experiment which used a deep machine learning based LSTM model to predict the next AP a client device would migrate to. In the experiment, a time series which tracked AP connection/association over time was constructed, and prediction was done based on past sequences in the time series. In order to construct the model, categorical APs were converted to numerical values by one hot encoding. The time series data was converted to training and testing data in a 80:20 ratio respectively. In the experiment, the LSTM model predicted the next AP a client device would migrate to with 79% accuracy.

Figure 9:
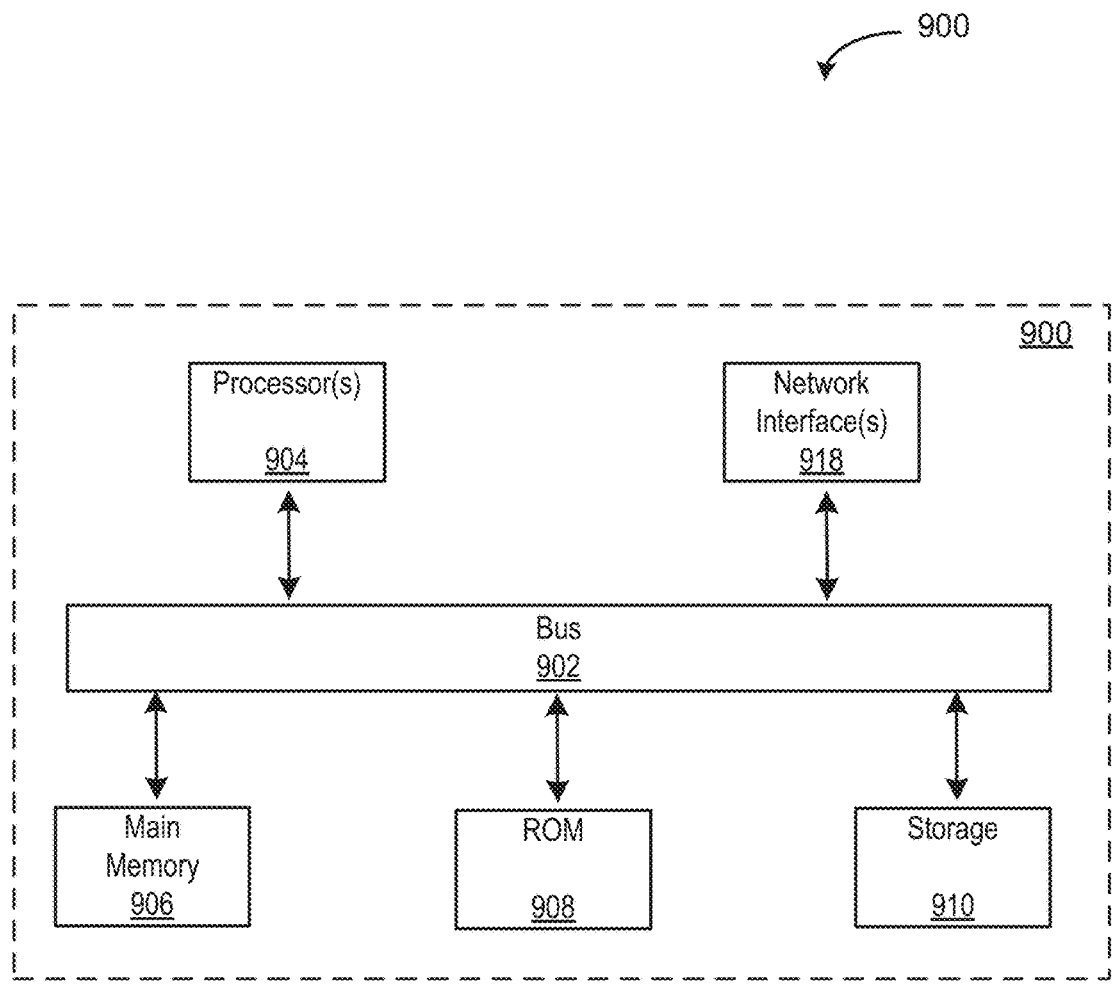
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable storage medium including instructions that, when executed by at least one processor of a computing system, cause the computing system to perform a method comprising:
   learning migration behavior associated with a client device including patterns of migration amongst access points (APs) and to which APs the client device connects most often;
   receiving a notification that comprises a current and a neighborhood list, wherein the current AP is the AP to which the client device is currently connected, and the neighborhood list is a list of APs in the neighborhood of the current AP;
   predicting an AP in the neighborhood of the current AP to which the client device will migrate next based on predicted probabilities of connections to the APs in the neighborhood, the predicted probabilities being based on the current AP and the learned migration behavior;
   generating an authentication client key for the predicted next AP; and
   propagating the authentication client key to the predicted next AP to facilitate pre-authentication of the client device prior to migration of the client device to the predicted next AP.

2. The non-transitory computer-readable storage medium of claim 1, wherein the authentication client key is a cryptographic key associated with the client device.

3. The non-transitory storage medium of claim 1, wherein the client device one of skips or undergoes shortened authentication procedures upon attempting to associate to the predicted next AP, the authentication client key having been cached by the predicted next AP.

4. The non-transitory storage medium of claim 1, wherein the instructions that when executed cause the learning of the migration behavior comprise further instructions causing the computing system to track movement of the client device between APs over time.

5. The non-transitory storage medium of claim 4, wherein the instructions that when executed cause the learning of the migration behavior comprise further instructions causing the computing system to record to which AP the client device is connected at various points over the time during which the movement of the client device is tracked.

6. The non-transitory computer-readable storage medium of claim 1 including further instructions that when executed by the at least one processor of the computing system, causes the computing system to derive the neighborhood list based on path loss value relative to the current AP.

7. The non-transitory computer-readable storage medium of claim 6, wherein the instructions that when executed cause the derivation of the neighborhood list comprise further instructions to cause the computing system to calculate path loss values between the current AP and APs neighboring the current AP.

8. The non-transitory computer-readable storage medium of claim 7, wherein the instructions that when executed cause the predicting of the AP to which the client device will migrate next comprise further instructions to cause the computing system to execute one or more machine learning operations to determine a probability of being an AP to which the client device will migrate next.

9. The non-transitory computer-readable storage medium of claim 8, wherein the instructions that when executed cause the predicting of the AP to which the client device will migrate next comprise further instructions to cause the computing system to select that AP having the highest probability of being the AP to which the client device will migrate next.

10. A system, comprising:
    at least one processor; and
    a memory storing instructions that, when executed by the at least one processor, cause the system to perform a method comprising:
      learning migration behavior of a client device including patterns of migration amongst access points (APs) and to which APs the client device connects most often;
      determining a current AP to which the client device is currently connected
      allocating a cryptographic authentication key associated with the client device to a predicted target AP to which the client is expected to migrate, the predicted target AP having been determined based on predicted probabilities of connections to the APs in a neighborhood list, the predicted probabilities being based on the current AP and the learned migration behavior of the client device; and
      reestablishing at least one of existing security or quality of service (Qos) parameters relevant to the client device prior to reconnecting to the predicted target AP.

11. The system of claim 10, wherein the instructions that when executed cause the system to learn the migration behavior comprise further instructions that cause the system to track movement of the client device between APs over time.

12. The system of claim 11, wherein the instructions that when executed cause the learning of the migration behavior comprise further instructions that cause the system to record to which AP the client device is connected at various points over the time during which the movement of the client device is tracked.

13. The system of claim 10, wherein the memory stores further instructions that when executed by the at least one processor of the computing system, causes the system to derive the neighborhood list based on path loss value relative to the current AP.

14. The system of claim 13, wherein the instructions that when executed cause the derivation of the neighborhood list comprise further instructions that cause the system to calculate path loss values between the current AP and APs neighboring the current AP.

15. The system of claim 10, wherein the instructions that when executed cause the predicting of the target AP to which the client device will migrate next comprise further instructions to cause the computing system to execute one or more machine learning operations to determine a probability of being an AP to which the client device will migrate next.

16. The system of claim 15, wherein the instructions that when executed cause the predicting of the target AP to which the client device will migrate next comprise further instructions to cause the computing system to select that AP having the highest probability of being the AP to which the client device will migrate next.

17. The method of claim 13, wherein the instructions that when executed cause the system to learn the migration behavior comprise further instructions that cause the system to build a Markov chain where each connection point of the Markov chain represents an AP on neighborhood list.

18. The system of claim 10, wherein the client device one of skips or undergoes shortened authentication procedures upon attempting to associate to the predicted target AP, prior to connection of the client device to the predicted target AP, the cryptographic authentication key having been cached by the predicted target AP.

19. A method, comprising:

receiving at a target access point (AP) predicted to be an AP to which a client device will connect, a cryptographic authentication key indicative of the client device, the predicted target AP having been identified based on learned patterns of migration amongst APs and to which APs the client device connects most often;

caching at the target AP, the cryptographic key, prior to a BSS transition;

upon the client device associating to the target AP, pre-authenticating the client device by reestablishing at least one of existing security or quality of service (QOS) parameters relevant to the client device at the target AP; and after associating the client device to the target AP and after the pre-authentication of the client device by the target AP, effectuating the BSS transition of the client device to the target AP.

20. The method of claim 19, wherein the cryptographic authentication key is received from a key management service operating to:

learn migration behavior of the client device;

determine a current AP to which the client device is currently associated; and allocate the cryptographic authentication key to the target AP, the target AP having been predicted based on the current AP and the learned migration behavior of the client device.

21. The method of claim 20, further comprising determining a neighborhood list of APs based on the current AP and the learned migration behavior of the client device, the target AP being one AP in the neighborhood list of APs.

* * * * *